United States Patent [19]
Mannschke

[11] 4,247,164
[45] Jan. 27, 1981

[54] PLUG AND SOCKET OPTICAL FIBER CONNECTIONS

[75] Inventor: Lothar P. Mannschke, Eckental, Fed. Rep. of Germany

[73] Assignee: U.S. Philips Corporation, New York, N.Y.

[21] Appl. No.: 13,586

[22] Filed: Feb. 21, 1979

[30] Foreign Application Priority Data

Mar. 1, 1978 [NL] Netherlands ............................ 7802230

[51] Int. Cl.³ ................................................ G02B 5/14
[52] U.S. Cl. ................................ 350/96.21; 350/96.20
[58] Field of Search .......................... 350/96.20, 96.21

[56] References Cited

U.S. PATENT DOCUMENTS

| | | | |
|---|---|---|---|
| 3,946,467 | 3/1976 | Lukas et al. | 350/96.20 |
| 4,076,376 | 2/1978 | Slaughter | 350/96.21 |
| 4,102,561 | 7/1978 | Hawk et al. | 350/96.21 |

FOREIGN PATENT DOCUMENTS

| | | | |
|---|---|---|---|
| 7507375 | 12/1975 | Netherlands | 350/96.21 |
| 1456395 | 11/1976 | United Kingdom | 350/96.21 |

*Primary Examiner*—Stewart J. Levy
*Attorney, Agent, or Firm*—Marc D. Schechter

[57] ABSTRACT

The invention relates to a plug and a socket for coupling an optical fiber to another optical fiber or to a light source or detector for optical communication purposes. The plug is provided with a tenon which fits into a recess of the socket. When inserting the tenon into the recess, the fiber is lifted from a groove in the tenon and pushed into a groove in the bottom of the recess by means of an elastic cushion. The tenon is provided with fitting pieces which, in conjunction with chamfers formed in the socket, bring the position of the tenon into alignment with the position of the recess.

17 Claims, 5 Drawing Figures

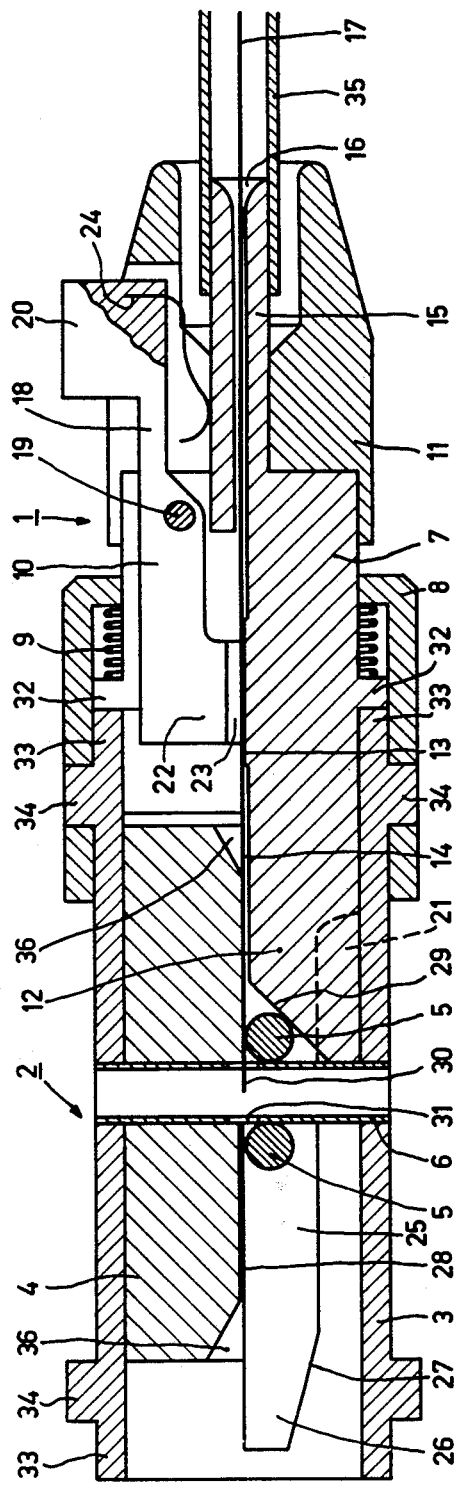

PLUG AND SOCKET OPTICAL FIBER CONNECTIONS

BACKGROUND OF THE INVENTION

The invention relates to a detachable plug and socket connection for coupling an optical fibre to a further optical fibre or to a light source or detector. The plug and socket connection comprises a socket having a fiber guide and a plug comprising a fiber container for accommodating a fiber portion adjacent to an end of an optical fiber. The plug can be secured and locked in the socket.

Furthermore the invention relates to a plug and a socket, individually, for such a plug and socket connection.

A plug and socket connection, as described above, is disclosed in U.K. Pat. No. 1,456,395. The plug and socket connection disclosed therein for coupling optical fiber has plugs by means of which the fiber ends can be coupled and disconnected rapidly and, if necessary, repeatedly.

When coupling optical fiber by means of such a plug, the fibers to be coupled are not supported in the socket over a length approximately equal to half the length of the fiber guide prior to and during coupling of the fibers. As optical fiber can withstand only a low buckling load, not supporting the fibers entails the risk of fiber breakage prior to or during insertion of the plug into the socket.

A coupling between optical fibers used in, for example, communication equipment must have the highest possible light transmission efficiency. A high efficiency is particularly important when coupling fiber for telecommunication. This efficiency is determined, inter alia, by the alignment of the fiber ends, by the distance between the end faces of the fiber ends, and by whatever is present between the end faces. In order to obtain a highest possible efficiency for a coupling the end faces must substantially abut. The above-mentioned U.K. Pat. No. does not disclose in what manner and by what means the distance between the end faces of the fiber ends can be adjusted.

SUMMARY OF THE INVENTION

It is an object of the invention to provide a plug and socket connection wherein the fibers are supported over substantially the entire length at all times.

A further object of the invention is to provide a connecting plug by means of which a reliable coupling can be rapidly, and, if necessary, repeatedly effected and interrupted between optical fibers or between an optical fiber and a light or detector, the distance between the end faces of the optical fibers to be coupled, or between a light source or detector and an end of an optical fiber to be coupled thereto, being adjustable in a simple manner.

According to the invention a plug and socket connection is characterized in that the plug is provided with a fiber container for accommodating a portion of a fiber near the fiber's end. The fiber container has a tenon and that the fiber container is provided in a fiber-supporting side thereof, with a groove for accommodating the optical fiber, the groove extending in an uninterrupted straight line over one side of the tenon. The socket is designed to accommodate at least one tenon, and it is provided with a recess in a bottom wherein a V-shaped groove is formed for accommodating the end of the optical fiber. The walls of the recess guide and orient the tenon with respect to V-shaped groove. There is provided between these walls at least an elastic cushion by means of which an end of the fiber is lifted from the groove in the tenon and pushed into the v-shaped groove, but not clamped there, when the plug is inserted into the socket. Such a plug and socket connection has the advantage that the fiber is supported over substantially its full length and that the end of the fiber is not lifted from the supporting groove and pushed into the V-shaped groove and accurately aligned there until at the very last moment of the coupling procedure. The elastic cushion exerts a pressure which is sufficient to position the fiber accurately in the V-shaped groove but the pressure does not become so great that the fiber is clamped. As a result, the fiber can be moved in the longitudinal direction which is advantageous, as will become apparent hereinafter.

A preferred embodiment of a plug and socket connection according to the invention is characterized in that the socket comprises at least a sleeve and an intermediate member, provided with recesses, chamfers having been formed on at least one side of the intermediate member. The chamfers guide the tenon into the recess in conjunction with fitting pieces formed at the tenon. In such a plug and socket connection the tenon is guided into the recess in the only possible manner by means of the chamfers and the fitting pieces. As a consequence damage to the optical fiber secured in the fiber container is substantially nill, which is advantageous.

A plug for a plug and socket connection is characterized in that the fiber container is provided with a clamping device by means of which the optical fiber is pushed into the groove of the fiber container. The fiber may either remain movable in the longitudinal direction of the groove or be clamped. The clamping device comprises a pressure piece and a return spring. It is possible to lift the pressure piece from the fiber-supporting side of the fiber container by pushing against the return spring. Such a plug has the advantage that it is possible to move the fiber in the longitudinal direction by means of a simple construction. Such a feature has proved to be useful as it allows adjustment of the distance between the two ends of the fibers or between the end of a fiber and a light source or detector.

A socket for a plug and socket connection according to the invention is characterized in that the sleeve is provided, on at least one side, with connecting means. The walls for guiding the tenon extends over guide pins which are formed at the ends of intermediate member. The guide pins are provided with chamfers. The socket has the advantage that the plug can be inserted easily, but only in the proper manner, into the socket by means of the guide pins and the chamfers formed on the guide pins. As a consequence the risk of damage to the optical fibers is substantially nill.

It is also useful to provide a hole in the centre of the socket perpendicular to and intersecting the V-shaped groove. This hole enables a visual inspection of the coupling, after which it is possible to shift the fibers in the longitudinal direction in order to adjust the distance between the fiber ends.

The invention will be further explained with reference to the drawing.

BRIEF DESCRIPTION OF THE DRAWINGS

FIG. 1a shows a cross-sectional view through a plug and socket connection having a plug and a socket according to the invention.

FIG. 1b shows a cross-section and a plan view of a further embodiment of the socket shown in FIG. 1a.

FIG. 1c shows a cross-section of a further embodiment of the plug shown in FIG. 1a.

DESCRIPTION OF THE PREFERRED EMBODIMENTS

Figure 2B:
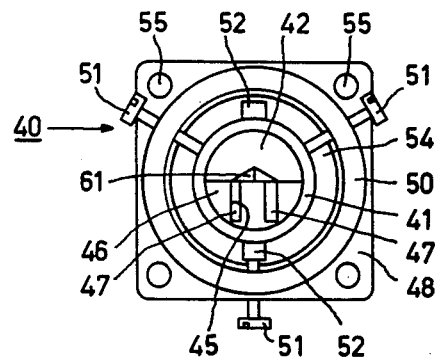
FIGS. 2a and 2b show a cross-sectional view and an elevational view, respectively, of a further socket according to the invention.

The cross-sectional view, shown in FIG. 1a, of plug 1 and socket 2 is taken in a symmetry plane of both the plug and the socket. The socket 2 is assembled from a cylindrical sleeve 3, an intermediate member 4, two elastic cushions 5 and a hollow tube 6. Alternatively, a ring-shaped cushion can be disposed around the tube 6, instead of two cushions 5. The plug 1 comprises a fiber container 7, an attachment cap 8, a pressure spring 9, a clamping device 10, and a protective cap 11. The fiber container 7 has a tenon 12. The clamping device 10 is secured in a slot in the fiber container 7, a bottom of the slot mating with one side of the tenon 12. A groove 14 extends in a straight line along the side of the tenon and along the bottom of the slot. Furthermore, there is formed at the fiber container 7 a lead-in pipe 15 having a flared lead-in opening 16 at one side and whose other side ends in the groove 14 in the bottom of the slot. An optical fiber 17 can be introduced in a simple manner into the groove 14 in the slot and the tenon 12 via the lead-in pipe 15. The clamping device 10 locks the fiber 17 after it has been introduced into the fiber container 7. To that end the clamping device 10 is constructed as a lever 18 which can be moved around a shaft 19. One side of the lever 18 is provided with a pushbutton 20 and the other side with a pressure piece 22. The pressure piece 22 comprises an elastic disc 23 which pushes the optical fiber 17 into the groove 14 of the fiber container 7 by means of the spring tension of a return spring 24. The return spring 24 can be a leaf spring attached under the pushbutton 20 and bearing on the lead-in pipe 15. The groove 14 is V-shaped over a length 13 under the elastic disc 23, the advantage thereof being that the optical fiber 17 is oriented in the longitudinal direction of the groove 14. The spring tension of the return spring 24 is sufficient to clamp fiber 17 into the V-shaped groove length 13. Full or partial elimination of the clamping force can be effected by depressing the pushbutton 20, after which the fiber can be moved. When adequate pressure is exerted on the pushbutton 20, the fiber 17 can only be moved into the longitudinal direction of the groove 14.

The tenon 12 of the fiber container 7 is accommodated in a recess in the intermediate piece 4 when the plug 1 and the socket 2 are joined. The recess is located between guide walls 25 of intermediate piece 4. Intermediate piece 4 has guide pins 26 which extend longitudinally therefrom and have one wall in the same plane as the guide walls. Guide walls 25 are for assuring the proper orientation of the tenon 12 when inserted in socket 2 intermediate piece 4. A hole, in which a hollow tube 6 is disposed, is drilled in the centers of the sleeve 3 and the intermediate piece 4 perpendicular to a longitudinal axis of the socket 2. Two elastic cushions 5 are disposed, on either side of the can 6 between the guide walls 25. The cushions have a function which will be described below. Optionally, the cushions 5 can also be placed in apertures which have been obtained by, for example, piercing the walls 25, which results in a simple construction and mounting of the cushions 5.

The bottom of the recess is provided with a V-shaped groove 28 which, with respect to a plane between the bottom of the recess and the side of the tenon 12, is a mirror image of the groove 14 in the tenon 12. Groove 28 extends longitudinally through socket 2. If the plug 1 is pushed in the socket 2, the plug 1 is first oriented relative to the socket 2 because the tenon 12 is guided into the recess by the guide walls 25. The V-shaped groove 28 has at its ends V-shaped flared apertures 36 to allow easy passage of fiber end 30 of fiber 17 under the groove 28. The end of tenon 12 is provided with a chamfer 29 which slightly pushes one of the elastic cushions 5 against the bottom of the recess as soon as the plug 1 has been inserted into the socket 2 over a sufficient length. A fiber 17 which has an end located in the groove 14 of the tenon 12, is passed, when the plug 1 is inserted in the socket 2, over the elastic cushion 5 and pushed in the V-shaped groove 28. The end 30 of fiber 17 is not clamped by elastic cushion 5, so that the fiber can be moved in the longitudinal direction after pushbutton 20 is depressed. The cushions 5 have, for example, a circularly cylindrical shape with flat end faces bearing on the guide walls 25. Such a shape has a small contact area with the fiber end 30 so that clamping of the end 30 in the groove 28 will not occur.

Consequently, the end 30 of the fiber 17 can be pushed into the tube 6 which has been provided, to that end, with suitable apertures 31 transverse to the tube axis. The tube 6 allows a visual inspection (by means of optical means such as an illumination, microscope) of a coupling between the ends of two optical fiber inserted into the tube 6 through opposite apertures 31. A suitable coupling liquid, having a refractive index adapted to the refractive indices of the fibers, can be applied between the ends of the fibers via the tube 6.

In a preferred embodiment of a plug and socket connection according to the invention, the socket 2 has been provided, as shown in FIG. 1a, with chamfers 27 formed at the guide pins 26. Tenon 12 fitting pieces 21 extending transversely therefrom. When the tenon 12 is inserted into the socket 2 the fitting pieces 21 slide over the chamfers 27 causing the fiber container 7 to be pushed lightly against the sleeve 3 of the socket 2, so that the tenon 12 is oriented with respect to the recess in the intermediate member 4. As a result, fiber end 30 is accurately guided into the V-shaped flare 36 and from there into the subsequent groove 28 by the joint action of the chamfers 27 and the fitting pieces 21. This prevents damage to the fiber end 30 owing to careless handling when inserting the tenon 12 into the socket 2.

To ensure that the fiber container 7 in the socket 2, the fiber container 7 is placed in its desired ultimate position is provided with a shoulder 32 bearing against the edge 33 of the sleeve 3 when the plug 1 has been inserted sufficiently far into the socket 2. Shoulder 32, attachment cap 8, which is provided with L-shaped slots (not shown), pressure spring 9, disposed between the shoulder 32 and the attachment cap 8, and keys 34 formed at the sleeve 3 constitute means for detachably connecting plug 1 and socket 2. Here the connecting means is a bayonet fitting which is known per se. Sleeve 3 and the attachment cap 8 can, of course, also be provided with screw threads for their connection.

A protective sleeve 35, which must protect the fiber 17 from at least mechanical loads, is attached to the lead-in pipe 15. A protective cap 11, by means of which the user of the plug 1 can exercise counter-pressure on the plug 1 when operating the pushbutton 20 is placed on the fiber container 7, thus preventing damage to the lead-in pipe 15, the fiber 17 passed therethrough, and also to the protective sleeve 35. The pushbutton 20 of the lever 18 is passed through a slot in the protective cap 11, enabling a compact structure of the plug 1.

FIG. 1b shows another construction for the attachment of the elastic cushion 5. The cushion 5 is ring-shaped and is disposed against the bottom of the center of the recess of the intermediate piece 4, as shown in the Figure. A segment 70 of a circularly cylindrical body is arranged against the ring-shaped cushion 5. A recess 71 into which the ends 72 of the segment 70 fit are formed in each guide wall 25. The assembly of intermediate piece 4, the cushion 5 and the segment 70 is thereafter pushed into the sleeve 3 of the socket 2 and secured, for example by means of screwing. The sleeve 3 and the intermediate piece are provided with holes (not shown) suitable for this purpose. For clarity, a cross-section of the segment 70 is shown in the drawing adjacent to the elevational view.

The segment 70 has an aperture 73 adjoining the space 74 enclosed by the ring-shaped cushion 5. The sleeve 3 has a further aperture adjoining the aperture 73 in the segment 70. This enables inspection of the coupling of the two fiber ends arranged in the V-groove 28 (see FIG. 1a). Furthermore, the segment 70 has cut-outs 75 which accommodate the fitting pieces 21 of the tenon 12 when a plug 1 is inserted into the socket 2.

The remaining reference numerals used in FIG. 1b correspond to those in FIG. 1a.

The socket 2 of FIGS. 1a and 1b is also symmetric about a plane coming out of the paper along the axis of tube 6. In order to couple two fiber ends together, plugs are provided on each fiber end and these plugs are coupled to opposite ends of a single socket.

FIG. 1c shows a cross-section through a plug having another type of clamping device. The fiber container comprises a semi-circular body 80 having a groove 82 in the flat side 81. The body is arranged in a circular housing 83. A pressure piece, in this case an elastic disk 84, which is retained by a spring 85, is arranged on the flat side 81. The spring 85 bears on the housing 83 and is secured in the housing 83 by means of a lug 86 inserted in an aperture 87. The housing 83 and the body 80 have a hole 88 which ends below an end 89 of the spring 85. The elastic disk 84 can be pushed away from the flat side 81 by means of a pin 90 through the hole 88.

Figure 2A:
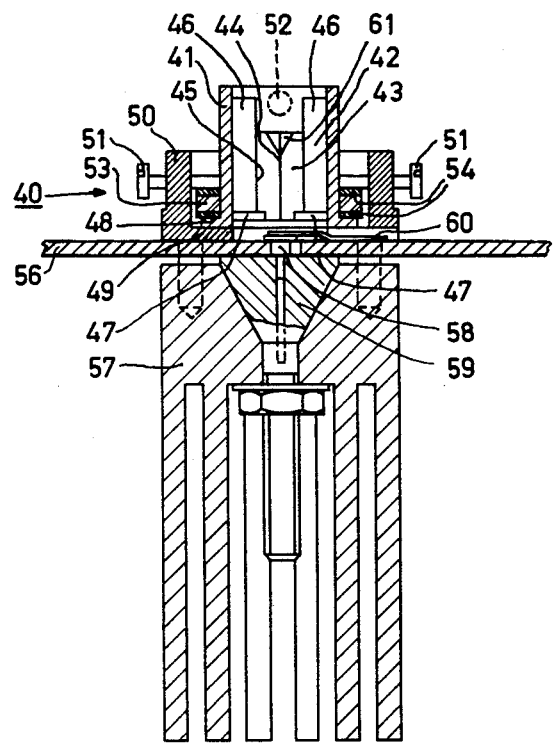

A plug 1, whether or not according to the preferred embodiment, is connectable, by means of keys 52 provided on sleeve 41 to the socket 40, shown in FIGS. 2a and 2b. The socket 40 for a light source-optical fiber plug and socket connection, comprises a sleeve 41 and an intermediate member 42 placed therein. Intermediate member 42 has a recess which is provided with a V-shaped groove on the bottom which ends in a V-shaped extension 61. The intermediate member 42 is more or less the same shape as the intermediate member 4 of the socket 2 of FIG. 1a and it has the same function. The guide walls 45 which extend over the guide pins 46 can be clearly distinguished. Formed at the intermediate member 42 are two supports 47 against which an elastic cushion, placed between the guide walls 45, must rest. The cushion is not shown in the Figure for clarity.

The sleeve 41 is provided with a flange 48 which bears on a supporting plane 49 of an outer housing 50. Three set screws 51 by means of which the position of the sleeve 41 can be adjusted with respect to the outer housing 50 are fitted in the outer can 50. A ring-shaped spring-fitted element 53 between two disks 54 by means of which the flange 48 can be pushed onto the supporting plane 42 of the outer housing 50 is arranged between the ends of the set screws and the flange 48. The above arrangement prevents sleeve 41 and the intermediate member 42 arranged therein from being mechanically loaded. As shown in FIG. 2b the supporting plane 49 extends to beyond the circumference of the outer housing 50 and is provided there with threaded holes 55, by means of which the socket 40 is mountable on a support 56 as shown in FIG. 2a.

In this case the support 56 is a printed circuit board on which the socket 40 is clamped together with a cooling member 57 for a semiconductor light source 58. One side of the light source 58 is clamped in a mounting clamp 59, the other side is connected to an electric circuit on the support 56 by means of a contact spring 60. The electric circuit for the light source 58 is closed via the electrically conducting mounting clamp 59.

The position of an end of an optical fiber to be inserted into the socket 40 (by means of the plug 1 shown in FIG. 1) can be adapted to the position of the light source 58 by means of the set screws 51 in order to obtain a most favorable light transmission from the light source 58 to the fiber.

What is claimed is:

1. A detachable plug and socket connection, for coupling an optical fiber to another optical fiber or to a light source or detector, comprising:
    a plug and socket with means for detachably connecting the plug and socket, wherein the plug comprises:
    a fiber container having a tenon formed at one end thereof, said tenon having a chamfer at an end remote from the fiber container and a groove therein for accommodating a portion of an optical fiber which is adjacent to an end of the fiber, said groove extending uninterrupted along a side of the tenon; and
    wherein the socket comprises:
    an intermediate piece with a recess for accommodating the tenon, said intermediate piece having a groove for accommodating the end of the optical fiber, said intermediate piece having guide walls for orienting the tenon such that when the plug and socket are connected the grooves in each are situated opposite each other over at least part of their length; and
    an elastic cushion, situated adjacent the groove in the intermediate piece and between the guide walls, such that on insertion of the plug into the socket, the chamfered end of the tenon pushes the elastic cushion which in turn lifts the end of the optical fiber into the groove of the intermediate piece.

2. A detachable plug and socket connection as claimed in claim 1, wherein the grooves in the intermediate piece are V-shaped and extend in straight lines.

3. A detachable plug and socket connection as claimed in claim 2, wherein:
    the tenon further comprises fitting pieces; and the socket further comprises a sleeve, surrounding the intermediate piece, the intermediate piece being provided with chamfers which, in conjunction with the fitting pieces, guide the tenon into the recess.

4. A detachable plug and socket connection as claimed in claim 3, wherein the fiber container is provided with a clamping device which pushes the optical fiber into the groove of the fiber container, the fiber being movable in the longitudinal direction of the groove or being clamped, the clamping device comprising a pressure piece and a return spring which allows lifting the pressure piece from the groove of the fiber container by pushing against the force of the return spring.

5. A detachable plug and socket connection as claimed in claim 4, wherein the clamping device further comprises a lever which is arranged rotatably around a shaft in a slot formed in the fiber container, a bottom of the slot forming the groove, it being possible to lift the pressure piece from the bottom by pushing against the spring force on an end of the lever opposite the pressure piece.

6. A detachable plug and socket connection as claimed in claim 4, wherein the fiber container is provided with an opening which ends in the grooved side of the fiber container under an end, secured to the pressure piece, of the return spring or under the pressure piece.

7. A detachable plug and socket connection as claimed in claim 6, wherein the groove in the fiber container is V-shaped, at least at the site of the pressure piece.

8. A detachable plug and socket connection as claimed in claim 7, wherein there is formed at the fiber container at an end opposite the tenon, a lead-in pipe for the optical fiber, said lead-in pipe having a cylindrical cavity with a flared opening at one end, the other end terminating at the groove of the fiber container, the return spring bearing on the lead-in pipe.

9. A detachable plug and socket connection as claimed in claim 3, wherein the sleeve is provided on at least one side with attachment means, the guide walls extending over guide pins formed at the intermediate piece and provided with chamfers.

10. A detachable plug and socket connection as claimed in claim 9, wherein the socket is constructed symmetrically, attachment means to which a plug is connectable for coupling two optical fibers being provided on either side of the socket.

11. A detachable plug and socket connection as claimed in claim 10, wherein a hole is drilled through the center of the socket, perpendicular to and intersecting the V-shaped groove.

12. A detachable plug and socket connection as claimed in claim 11, wherein a tube is disposed in the drilled hole, said tube having apertures at the site of the V-shaped groove, an elastic cushion being placed on either side against the tube.

13. A detachable plug and socket connection as claimed in claim 12, wherein the elastic cushion is ring-shaped and contacts the V-shaped groove in two places, a flat side of a segment of a circularly cylindrical body being placed against the cushion, the curved side bearing against the sleeve, the cushion being slightly clamped between the segment and the intermediate piece.

14. A detachable plug and socket connection as claimed in claim 13, wherein the sleeve has an opening which continues into the segment and ends into the cavity enclosed by the ring-shaped cushion.

15. A detachable plug and socket connection as claimed in claim 9, wherein the sleeve is provided at one side with attachment means for the plug and the sleeve is placed in an outer housing which is provided with mounting means by means of which the socket is attachable to a support of a light source or detector, the outer housing further being provided with adjusting means for positioning the V-shaped groove of the intermediate piece with respect to the light source or detector to be mounted.

16. A detachable plug and socket connection as claimed in claim 15, wherein the sleeve has a flange which bears on a supporting plane of the outer housing and wherein set screws are fitted in the outer housing by means of which the intermediate piece can be positioned in the sleeve with respect to the outer housing, a ring-shaped elastic body being arranged between the flange and the ends of the set screws.

17. A socket for coupling an optical fiber, a light source, or a detector in the socket to another optical fiber in a plug, said plug comprising a fiber container having a tenon formed at one end thereof, said tenon having a chamfer at an end remote from the fiber container, said fiber container having a groove therein for accommodating a portion of an optical fiber which is adjacent to an end of the fiber, said groove extending uninterrupted along a side of the tenon; and said socket comprising:

means for detachably connecting the plug and socket;
an intermediate piece with a recess for accommodating the tenon, said intermediate piece having a groove for accommodating the end of the optical fiber and guide walls for orienting the tenon such that when the plug and socket are connected the grooves in each are situated opposite each other over at least part of their length; and
an elastic cushion, situated adjacent the groove in the intermediate piece and between the guide walls, such that on insertion of the plug into the socket, the chamfered end of the tenon pushes the elastic cushion which in turn lifts the end of the optical fiber into the groove of the intermediate piece.

* * * * *